United States Patent
Janek et al.

(10) Patent No.: US 6,804,644 B1
(45) Date of Patent: Oct. 12, 2004

(54) TEXT PROCESSING SYSTEM INCLUDING A SPEECH RECOGNITION DEVICE AND TEXT CHANGE MEANS FOR CHANGING A TEXT-BLOCK DATA

(75) Inventors: Gabor Janek, Budapest (HU); Heribert Wutte, Graz (AT); Attila Muszta, Budapest (HU); Harald Röggla, Vienna (AT)

(73) Assignee: Koninklijke Philips Electronics N.V., Eindhoven (NL)

( * ) Notice: Subject to any disclaimer, the term of this patent is extended or adjusted under 35 U.S.C. 154(b) by 0 days.

(21) Appl. No.: 09/260,341

(22) Filed: Mar. 2, 1999

(30) Foreign Application Priority Data

Mar. 3, 1998 (EP) .............................................. 98890053

(51) Int. Cl.[7] .......................... G10L 15/22; G10L 15/26; G06F 17/24
(52) U.S. Cl. ........................ 704/235; 704/275; 715/531
(58) Field of Search ................................ 704/235, 251, 704/270, 275, 276; 715/500.1, 531

(56) References Cited

U.S. PATENT DOCUMENTS

| | | | |
|---|---|---|---|
| 5,386,494 A | | 1/1995 | White |
| 5,960,447 A | * | 9/1999 | Holt et al. .................. 704/235 |
| 6,088,671 A | * | 7/2000 | Gould et al. ................ 704/235 |
| 6,125,342 A | * | 9/2000 | Selesky .......................... 704/9 |
| 6,125,347 A | * | 9/2000 | Cote et al. .................. 704/275 |
| 6,480,206 B2 | * | 11/2002 | Prinzing ..................... 345/762 |
| 6,708,148 B2 | * | 3/2004 | Gschwendtner et al. .... 704/235 |

* cited by examiner

*Primary Examiner*—Richemond Dorvil
*Assistant Examiner*—Martin Lerner
(74) *Attorney, Agent, or Firm*—Michael E. Belk

(57) ABSTRACT

In a text processing system (1) are provided a speech recognition device (2) to which a spoken command information signal (SI) can be applied in a command inputting mode of the speech recognition device (2) and which is arranged for producing a control data (CI) assigned to one of the applied spoken command information signals (SI), and a text processing device (20, 21) which can be brought to an active state for processing a text data (TI), while a text-block data (MT) of a stored text data (TI) can be featured in the text processing device (20, 21) and the text processing device (20, 21) can be supplied with a control data (CI) by the speech recognition device (2) for changing a featured text-block data (MT) and, furthermore, text change means (32) are provided to which a further control data (BI) assigned to a further spoken command information signal (SI) can be delivered in the command inputting mode of the speech recognition device (2), while the text change means (32) are arranged for changing a text-block data (MT) featured in the text processing device (20, 21) in accordance with the further spoken command information signal (SI) applied to the speech recognition device (2).

4 Claims, 3 Drawing Sheets

| BI \ ARI | 1 | 2 | 3 | 4 |
|---|---|---|---|---|
| BOLD | --- | --- | CI = 5 | CI = 5 |
| ITALIC | --- | --- | CI = 6 | CI = 10 |
| UNDERLINE | --- | --- | CI = 7 | CI = 7 |
| CAPITALIZE | CI(TVM) = 12 | CI(TVM) = 12 | CI(TVM) = 12 | CI(TVM) = 12 |
| SET COLOR TO RED | --- | CI = 88 | CI = 23 | CI = 23 |
| SET TO NORMAL | --- | CI(TVM) = 17 | CI(TVM) = 17 | CI(TVM) = 17 |
| SET FONT TO ARIAL | --- | --- | CI = 50 | CI = 50 |
| CALCULATE SINE | CI(TVM) = 33 | CI(TVM) = 33 | CI(TVM) = 33 | CI = 67 |

TEXT PROCESSING SYSTEM INCLUDING A SPEECH RECOGNITION DEVICE AND TEXT CHANGE MEANS FOR CHANGING A TEXT-BLOCK DATA

BACKGROUND OF THE INVENTION

1. Technical Field

The invention relates to a text processing system by which a text data stored in the text processing system can be changed in accordance with a spoken command information signal delivered to the text processing system, including a speech recognition device to which a spoken command information signal can be delivered in a command inputting mode of the speech recognition device and which is arranged for delivering a control data assigned by the speech recognition device to the delivered spoken command information signal, and including a text processing device which can be brought to an active state for processing a stored text data, while a text-block data of the text data can be featured in the text processing device and a control data can be delivered to the text processing device by the speech recognition device for changing a featured text-block data.

The invention further relates to a speech recognition device to which a spoken command information signal can be applied and which is arranged for delivering a control data to at least one text processing device controlled to an active state, while the speech recognition device, in a command inputting mode of the speech recognition device, can be supplied with a spoken command information signal and the speech recognition device is arranged for producing a control data assigned to the applied spoken command information signal by the speech recognition device, and the text processing device can be supplied with a control data by the speech recognition device for changing a text-block data featured in the text processing device.

The invention further relates to a method of changing a text data stored in a text processing device in accordance with a spoken command information signal delivered to a speech recognition device, while a spoken command information signal is delivered to the speech recognition device in a command inputting mode of the speech recognition device and the speech recognition device delivers a control data assigned to the delivered spoken command information signal, and the text processing device is brought to an active state for processing a stored text data, and a text-block data of the text data is featured in the text processing device, and the text processing device is supplied with a control data by the speech recognition device for changing a featured text-block data.

2. Related Art

Such a text processing system, such a speech recognition device and such a method are known from the document U.S. Pat. No. 5,386,494A. The known text processing system is formed by a personal computer, which includes a microphone, a monitor, a keyboard and a computer mouse. The personal computer accommodates a text processing device by which a text data stored on a hard disk or in a Random Access Memory of the personal computer can be processed, thus read from the hard disk, displayed on the display screen and stored on the hard disk, while such a processing provides that a stored text data can be changed or edited. A cursor shown on the display screen can be positioned at a specific spot of a text data displayed on the display screen with the computer mouse, or a text-block data of a stored text data displayed on the display screen can be featured and marked. A featured text-block data is displayed in a particular manner on the display screen, for example, in an "Inverse Font". A control data for changing a featured text-block data may be activated by the keyboard or the computer mouse. As a result of the control data the featured text-block data may then be displayed, for example, in another font (Arial, Times New Roman, . . . ), in another type size (10 dots, 12 dots) or in a "Bold Type".

The personal computer of the known text processing system further includes a speech recognition device by which a speech data spoken into the microphone is recognized and a text data assigned to the recognized speech data can be delivered to the text processing device for further processing. By actuating a key of the computer mouse, a command-inputting mode can be activated in the known speech recognition device. In an active command inputting mode in the speech recognition device, a speech data spoken into a microphone, which forms a spoken command information signal here, is assigned to a control data of the text processing device. For changing a text-block data featured in the text processing device, a control data can be delivered to the text processing device by the speech recognition device.

In the known text processing system it has appeared, however, that the text processing device contains only a small number of control data, and thus only a small number of spoken command information signals can be delivered to the text processing system for changing a text-block data featured in the text processing device.

SUMMARY OF THE INVENTION

It is an object of the invention to remedy the problems described above and improve a text processing system as defined in the text stated in the first paragraph and a speech recognition device as defined in the text stated in the second paragraph and a method as defined in the text stated in the third paragraph, and provide an improved text processing system, an improved speech recognition device and an improved method of changing a text-block data.

For solving this problem, an improved text processing system is characterized in that the text processing system includes text change means to which can be delivered by the speech recognition device in the command inputting mode a further control data assigned to a further spoken command information signal, and in that the text change means are arranged for changing a text-block data featured in the text processing device in accordance with the further spoken command information signal delivered to the speech recognition device.

As a result, there is achieved in an advantageous manner that a text-block data featured in the text processing device can be changed not only by control data processed in the text processing device, but additionally by further control data that can be processed in the text change means. Advantageously, a large number of spoken command information signals can be delivered to the text processing system for changing a text-block data featured in the text processing device. More particularly, when in the text processing system different text processing programs—such as "Word for Windows", "Excel" and "Corel Draw" or "Lotus CC-mail" can be brought to their active state, which have each a strongly different number of control data for changing text-block data, it is advantageous to have additional further control data that can be processed by the text change means available as standard when one of these different text processing programs is used, which may respectively be activated by the further spoken command information signal assigned thereto.

In a text processing system according to the invention. As in an example of embodiment, a further text processing program—for example "Excel"—installed on the personal computer is provided as a further text editing means in addition to the text editing means already present in the text processing means. This advantageously achieves that a text-block data featured in an activated text processing device—for example "Word for Windows"—can additionally also be changed by an additional further control data that can be processed in the further text editing means—"Excel". Consequently, advantageously a very large number of spoken command information signals i.e. those to which control data are assigned that can be processed by the activated text processing device, and those to which further control data are assigned that can be processed in the text editing means, and those to which additional further control data are assigned that can be processed in the further text editing means, can be delivered to the text processing system for changing a text-block data featured in the text processing device.

In a further example of embodiment, the text editing means of the text change means are formed by a further text processing device installed on the personal computer. Separate text editing means may then be omitted from a speech recognition device, so that a highly cost-effective text processing system is obtained.

The measure of when the speech recognition device cooperate with a Windows processing device in a text processing system according to the invention—which processing device is realized, for example, by means of one of the "Windows 95", "Windows NT" or "X-windows" programs—there is advantageously achieved that the test means, the determining means and the text editing means may have a very simple structure. As a result, a simple text processing system and a simple speech recognition device are obtained, which are arranged for working together with a number of Windows text processing programs formed by, for example, "Word for Windows", "WordPerfect for Windows" or "Excel for Windows", "Lotus CC-mail" and further generally known Windows programs.

The advantages of a speech recognition device according to the invention and of an inventive method of changing a text-block data featured in a text processing device are obtained in accordance with the advantages indicated for the text processing system according to the invention.

The aspects described above and further aspects of the invention appear from the examples of embodiment to be described hereinafter and will be explained with reference to these examples of embodiment.

BRIEF DESCRIPTION OF THE DRAWINGS

The invention will be explained in the following with reference to a first example of embodiment represented in the drawings and with reference to a second and a third example of embodiment not shown in the drawings. The invention, however, is not restricted to these three examples of embodiment.

DESCRIPTION OF THE EMBODIMENTS

Figure 1:
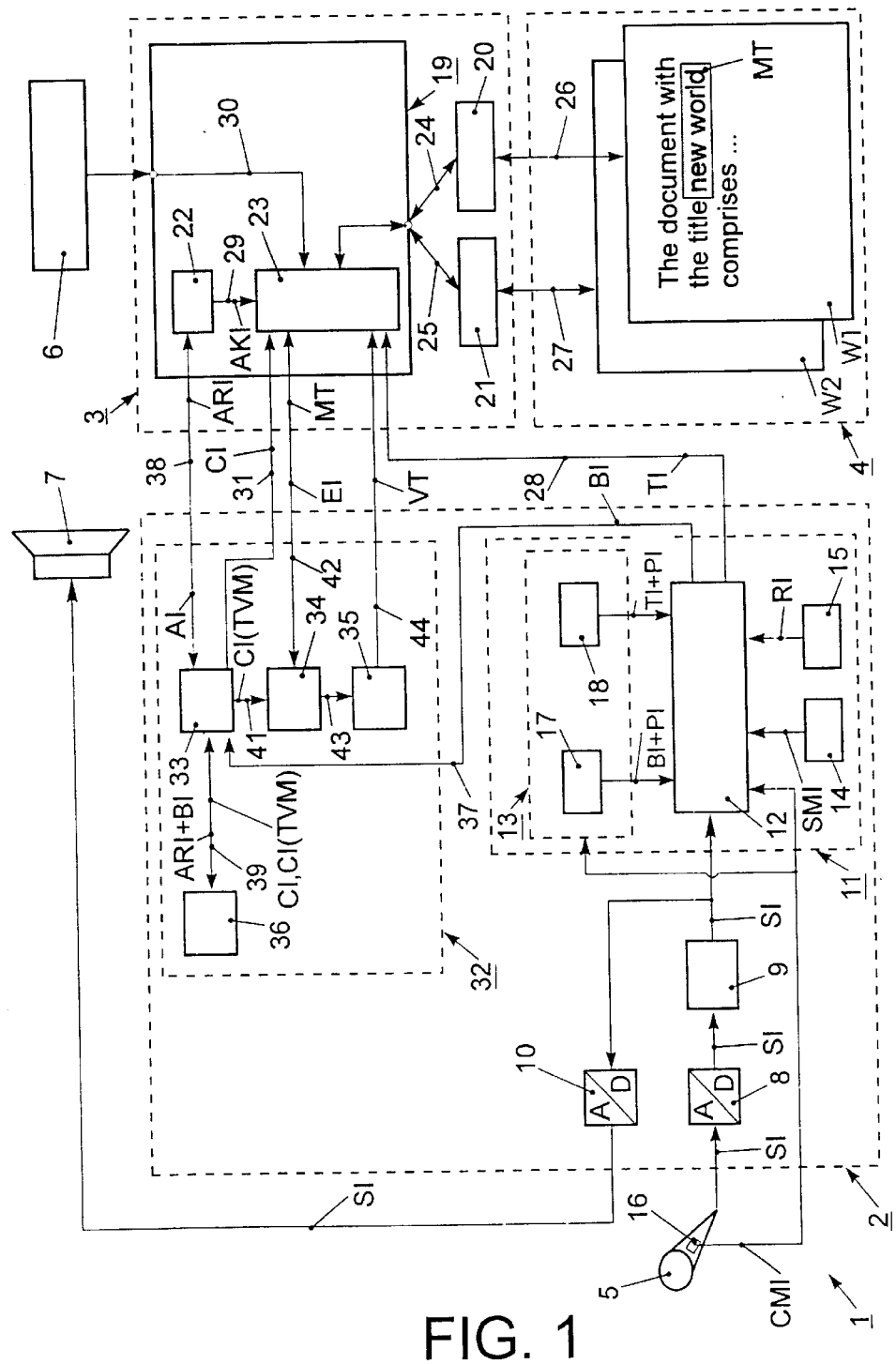
FIG. 1 diagrammatically shows in the form of a block circuit diagram as a text processing system according to the invention a personal computer in which a method according to the invention can be implemented and which includes a speech recognition device according to the invention that has text change means for changing a text-block data featured in a text processing device of the text processing system in accordance with a further spoken command information signal inputted into the speech recognition device.

FIG. 1 diagrammatically shows as a text processing system in the form of a block circuit diagram a personal computer 1, which includes a speech recognition device 2 and a PC processing device 3, and which includes a monitor 4 and to which are connected a microphone 5, a keyboard 6 and a loudspeaker 7. A text data stored in the text processing system can be changed in accordance with at least one spoken command information signal SI delivered to the text processing system, which will be discussed in further detail hereinafter.

The microphone 5 can deliver an analog speech data SI to an analog/digital converter stage 8 of the speech recognition device 2, which analog speech data consists of either individual words or of a plurality of coherent words. The analog/digital converter stage 8 can deliver a digital speech data SI to storage means 9 and store it there.

In a speech reproduction mode—which can be activated in a manner not further described here—a digital speech data SI read from the storage means 9 can be fed to a digital/analog converter stage 10 and from this stage to the loudspeaker 7 as an analog speech data SI.

For processing a digital speech data SI, the speech recognition device 2 includes speech recognition means 11, which include a speech recognition stage 12, a lexicon memory 13, a speech model memory 14 and a reference memory 15. A digital speech data SI read from the storage means 9 can be delivered to the speech recognition stage 12 of the speech recognition means 11. In a text-inputting mode, a text data TI represented by a speech data SI spoken by a speaker is delivered to the speech recognition means 11. In the text inputting mode, text data TI assigned to the speech data SI can be delivered to the PC processing means 3 by the speech recognition means 11.

To the speech recognition means 11 of the speech recognition device 2 can be delivered in a command inputting mode of the speech recognition device 2 a command data BI represented by a spoken command SI spoken by a speaker. The speech recognition device 2 is used for delivering command data BI assigned to the delivered spoken command information signal SI by the speech recognition device 2 and control data CI assigned to this command data BI by the speech recognition device 2.

The microphone 5 has a button 16 that can be actuated by a speaker for delivering a command-input activation data CMI by which the command-inputting mode in the speech recognition device 2 is activated. Such a command input activation data CMI can be given to the speech recognition stage 12 by the key 16. When there is no command input activation data CMI, the text-inputting mode in the speech recognition device 2 is activated.

For recognizing a digital speech data SI delivered to the speech recognition means 11 and for assigning a text data TI or command data BI to a recognized speech data SI or spoken command information signal SI, the speech recognition means 11 includes the speech recognition device 12, the lexicon memory 13, the speech model memory 14 and the reference memory 15. These three memories 13, 14 and 15 are connected to the speech recognition stage 12.

For storing words, the lexicon memory 13 stores or can store respectively, a text data TI and an identification data PI assigned to the text data TI. In this case this storing is organized in such a way that a text data TI, that is, a so-called grapheme, and an identification data PI, that is a so-called phoneme sequence assigned to the text data TI, are stored for each word. It should be observed that the storing of words may also be organized in another way.

The lexicon memory 13 includes a command vocabulary memory 17 and a text vocabulary memory 18. In the command vocabulary memory 17 are stored text data TI forming command data BI. The number of the text data TI stored in the command vocabulary memory 17 corresponds to the total number of the spoken command information signals SI that can be recognized by the speech recognition means 11 in the command inputting mode and thus forms a command vocabulary of the text processing system.

The text vocabulary memory 18 stores a plurality of text data TI which form the text vocabulary that can be recognized by the speech recognition means 11 in the text inputting mode.

As already observed, a command input activation data CMI generated with the key 16 can be fed to the speech recognition stage 12. A command input activation data CMI can be fed to the lexicon memory 13 by the speech recognition stage 12. When a command input activation data CMI occurs in the command inputting mode, the command vocabulary memory 17 of the lexicon memory 13 is connected to the speech recognition stage 12 and used in case of a subsequent recognition of a speech data SI and assignment of a command data BI. When a command input activation data CMI is absent in the text inputting mode, the text vocabulary memory 18 of the lexicon memory 13 is connected to the speech recognition stage 12 and used in case of a subsequent recognition of a speech data SI and assignment of a text data TI. In this manner it is guaranteed that the command vocabulary memory 17 of the speech recognition stage 11 is used for the recognition of a word or words forming a command data BI. The text vocabulary memory 18 of the speech recognition stage 11 is used for the recognition of a word or words forming a text data TI.

In the speech model memory 14 are stored speech model data SMI which express the probability of the occurrence of a word after the appearance of a certain combination or sequence of words recognized by the speech recognition stage 12. If during a speech recognition operation the next word contained in speech data SI including a plurality of successive words may with equal probability be either of two words according to the data stored in the lexicon memory 13 and the reference memory 15, the speech recognition stage 12 recognizes the word that has the greater probability of occurrence according to the speech model data SMI.

The reference memory 15 stores reference data SI, which represent data about how a speaker pronounces a phoneme or a phoneme sequence. With the aid of the reference data RI, the speech recognition stage 12 is adjusted to a speaker.

The PC processing means 3 of the personal computer 1 contain a Windows processing device 19 and a first text processing device 20 and a second text processing device 21.

The first text processing device 20 is formed by the known program "Lotus CC-mail", which has only a small number of control data CI that can be activated in "Lotus CC-mail" to change a text data TI. The second text processing device 21 is formed by the known program "Word for Windows" which has a large number of control data CI that can be activated in "Word for Windows" to change a text data TI, which will be further described in the following.

When the personal computer 1 has been activated, the Windows processing device 19 is always brought to its active state. The text processing devices 20 and 21 can be brought or controlled to an active state for processing text data, while only one of the text processing devices 20 and 21 can be controlled to its active state.

The Windows processing device 19 which, in essence, represents a program processing device for processing a so-called Windows program, and which in this case is formed with the aid of the known Windows 95 program, includes management means 22 for managing the two text processing devices 20 and 21 and communication means 23 for executing the communication between the speech recognition device 2, the keyboard 6 and the text processing devices 20 and 21. The management means 22 manage, inter alia, which of the text processing devices 20 and 21 is controlled to its active state and are provided for delivering an active data AKI featuring in the text processing device 20 or 21 controlled to its active state. Furthermore, the management means 22 are provided, in a manner not further shown in the FIG. 1, for determining and managing mode data ARI indicating the mode of a text processing device 20 or 21 controlled to its active state, which will be further discussed hereinafter.

It should be observed that the Windows processing device 19 is provided for managing and executing a communication between a plurality of text processing devices. In this respect, also a drawing program "Corel draw", in which also text data can be processed is meant to be understood as a text processing device.

The Windows processing device 19 is connected to the first text processing device 20 via a work line 24 and to the second text processing device 21 via a work line 25. With the first text processing device 20, a text data TI processed in the first text processing device 20 can be represented via a work line 26 in a processing window W1 assigned to the first text processing device 20. With the second text processing device 21, a text data TI processed in the second text processing device 21 can be represented via a work line 27 in a processing window W2 assigned to the second text processing device 21.

The first text processing device 20 has relatively limited possibilities for representing a text data TI in the processing window W1. For example, it is impossible to represent the text data TI or part of the text data TI, that is, a text-block data TI in bold type (BOLD) or in italics (ITALIC) or to underline (UNDERLINE) a text-block data TI. These types of representation of text data TI or a text-block data TI are made possible in a second text processing device 21 which has a relatively large number of types of representation and is more comfortable to the user. Text processing devices can be subdivided into certain types depending on the types of representation enabled by them, and on the control data CI that can be processed by them. The management means 22 of the Windows processing means 19 manage a type data ARI indicating the type of a text processing device 20, 21 controlled to its active state. In a matrix shown in a FIG. 3, type data ARI are given and possibilities of representation assigned to these type data by means of the assigned command data BI, which will be further discussed in the following.

It should be observed that the number of types of representation of the text processing devices 20 and 21 also depend on the respectively activated state of operation of the text processing device 20 or 21. When in the second text processing device 21 a processing state "load data set" is activated, in which text data TI stored under a document name on a hard disk not shown in the Figure can be downloaded from the hard disk for processing the text data TI, the second text processing device 21 is connected via the work line 27 to a processing window W3 not further shown in the FIG. 1. In the further processing window W3, the document name can be entered as text data TI in an input line provided for this purpose. In this operating state "load data set" it is impossible in the second text processing device 21 to represent a document name represented in the input line of the further processing window W3 in a bold type (BOLD) or italic type (ITALIC). In the operating state "load data set" a type data ARI=1 may then be assigned to the second text processing device 21, whereas in other operating states the type data ARI=3 can be assigned to the second text processing device 21. The type data ARI was assigned, so that a larger value of the number of the type data ARI features a text processing device in an operating state, in which a larger number of types of representation are possible than with a text processing device in an operating state that has a smaller value of the number of type data ARI.

The communication means 23 of the Windows processing device 19 is arranged, in essence, for conveying control data CI and text data TI between text processing devices 20 and 21 managed by the Windows processing device 19, and includes the speech recognition device 2 and the keyboard 6 which cooperate with the Windows processing device 19. For this purpose the management means 22 can apply an active data AKI to the communication means 23 via a work line 29, which active data features the text processing device 20 or 21 controlled to its active state. In the text inputting mode the speech recognition means 11 can deliver a text data TI to the communication means 23 of the Windows processing device 19 via a work line 28 and, depending on the available active data AKI, be delivered to the first or second text processing device 20 or 21 via the work line 24 or 25.

Furthermore, a control data CI for changing an operating state of a text processing device 20 or 21 controlled to its active state may be delivered by the keyboard 6 via a work line 30, while the communication means 23 are arranged for delivering the control data CI in accordance with an available active data AKI via the work line 24 or 25 to the text processing device 20 or 21 controlled to its active state. It is further possible to deliver a control data CI from the keyboard 6 via the work line 30 or from the speech recognition device 2 via a work line 31 to the communication means 23, and via the work lines 24 or 25 to the text processing device 20 or 21 controlled to its active state, so as to feature or change a featured text-block data MT. In this way, a text-block data MT of a stored text data TI can be featured in the text processing device 20 or 21 controlled to its active state, after which a control data CI can be delivered to the text processing device 20 or 21 by the speech recognition device 2 via the communication means 23 and the work lines 24 or 25 in order to change featured partial text information TI. This will be discussed in more detail hereinafter.

The text processing system now includes text change means 32 which include test means 33, determining means 34, text editing means 35 and an allocation memory 36. In the command inputting mode the speech recognition device 2 can deliver a further control data assigned to a further spoken command information signal SI to the text change means 32, which control data is here formed by a command data BI, while the text change means 32 are arranged for changing a text-block data MT featured in the text processing device 20 or 21 in accordance with the further spoken command information signal SI fed to the speech recognition device 2.

For this purpose, the test means 33 of the text change means 32 are used for testing whether the text editing means 35 are arranged for changing a text-block data MT featured in the text processing device 20 or 21 controlled to its active state in accordance with a spoken command information signal SI fed to the speech recognition device 2. For this test, a command data BI delivered by the speech recognition stage 12 can be delivered to the test means 33. The test means 33 are connected to the management means 22 via a work line 38. Via the work line 38, the test means 33 can deliver sign-on data AI to the management means 22, after which the management means 22 deliver a mode data ARI to the test means 33 via the work line 38, which mode data ARI features a text processing device 20 or 21 controlled to its active state, and the operating state thereof, which will be further discussed hereinafter.

The test means 33 are further connected to the allocation memory 36 via a work line 39. While using the mode data ARI and command data BI delivered to the test means 33, the test means 33 are arranged for testing, by means of data stored in the allocation memory 36 and contained in a matrix, how the command data BI can be processed in a text processing device in accordance with the mode data ARI delivered to the test means 33, and are thus arranged for determining a control data CI or a further control data CI(TVM), as will be further explained hereinafter.

Figure 3:
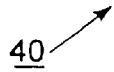
FIG. 3 shows a matrix that can be stored in an allocation memory of the text change means, which matrix determines whether the text processing device or the text editing means of the text change means is provided for processing a control data and thus for changing a text-block data featured in the text processing device.

A matrix 40 that can be stored in the allocation memory 36 with the aid of which the test means 33 determine a control data CI or a further control data CI(TVM), is shown in FIG. 3. The first row of the matrix 40 contains mode data ARI. Four different types of text processing devices in certain modes of operation are distinguished. The first column shows command data BI, which are also stored in the command vocabulary memory 17 of the speech recognition means 11, and which form the command vocabulary that can be recognized by the speech recognition means 11. Only a very limited command vocabulary is stated by means of which, however, by way of example, the function of the text processing system can be explained. The second row shows, for example, a command data BI="BOLD". The control data CI=5 can be assigned to the command data BI="BOLD" in accordance with the matrix 40 for the second text processing device 21 brought to its active state for a state of operation in which the second text processing device 21 can be assigned the mode data ARI=3. A control data CI=5, delivered to the second text processing device 21 in the operating state by the keyboard 6 via the work line 30 or by the speech processing device 2 via the work line 31 and the work line 25, provides that a text-block data MT featured in the second text processing device 21 is displayed in "BOLD" type.

When the operating state "load data set" is activated in the second text processing device 21, and the mode data ARI=1 is to be assigned to the second text processing device 21, the command data BI="BOLD" according to the matrix 40 cannot be assigned control data CI, because the second text processing device 21 is not arranged for representing text data in "BOLD" type in this operating state.

The matrix 40 stores further control data CI(TVM). If a text processing device has no control data CI that is to be assigned for executing a spoken command SI, which text processing device, however, is arranged for representing a changed text-block data VT in accordance with the spoken command information signal SI, then a further control data CI(TVM) is stored in the allocation memory 36 for a command data BI assigned to this further spoken command information signal SI. The text change means 32 are provided for processing the further control data CI(TVM), so that the number of spoken command information signals SI, by which a text-block data MT featured in the text processing device can be changed, are increased.

Such a command data BI assigned to a further spoken command information signal SI is, for example, "CAPITALIZE". A further control data CI(TVM)=12 in the matrix 40 is assigned to this command data BI. The further control data CI(TVM)=12 provides that each word of a text-block data MT featured in the text editing means 35 of the text change means 32 begins with an initial capital letter. Neither the first text processing device 20 nor the second text processing device 21 is provided for processing the further command data BI="CAPITALIZE", as a result of which the command vocabulary of the two text processing devices 20 and 21 is extended by the spoken command information signal SI assigned to the command data BI="CAPITALIZE".

When during their test the test means 33 establish that the allocation memory 36 has stored a further control data CI(TVM) for specific mode data ARI and command data BI in the matrix 40, there will be a positive result of the test if the text editing means 35 are arranged for changing a text-block data MT featured in the text processing device 20 or 21 in accordance with a spoken command information signal SI delivered to the speech recognition device 2. After this, the determining means 34 are arranged for determining a text-block data MT featured in the text processing device 20 or 21 via a work line 42, and for delivering the determined text-block data MT to the text editing means 35 via a work line 43. In a Windows text processing device, a text-block data MT can be determined in a very simple manner.

The text editing means 35 are arranged for changing the determined and delivered text-block data MT in accordance with the further spoken command information signals SI fed to the speech recognition device 2 and in accordance with the further control data CI(TVM) fed thereto by the determining means 34 via the work line 43. Subsequently, the text change means 32 and, in this respect particularly the text editing means 35, are arranged for delivering its changed text-block data VT via a work line 44, the communication means 22 and the work line 24 or 25 to the text processing device 20 or 21, and thus for replacing the text-block data MT featured in the text processing device 20 or 21 with the changed text-block data VT in the text processing device 20 or 21.

This advantageously achieves that a text-block data MT featured in the first or second text processing device 20 or 21 may not only be changed by control data CI that can be processed in the active-state-controlled text processing device 20 or 21, but, additionally, by further control data that can be processed in the text change means 33. Advantageously, a large number of spoken command information signals SI can be sent to the text processing system for changing text-block data MT featured in text processing device 20 or 21 controlled to its active state. This further achieves a simple and reliable text processing system with a speech recognition device.

A program run running in the personal computer 1 while the speech recognition device 2 is used, which program run is executed for changing a text-block data MT featured in the text processing devices 20 and 21 in accordance with a spoken command information signal SI delivered to the speech recognition device 2, is described in the following with reference to a flow chart 45 shown in FIG. 2.

With the explanation of the program run according to the flow chart 45, it is assumed with the first application that a spoken command SI is given to the text processing system shown in FIG. 1, to which the command data BI="SET COLOR TO RED" can be assigned. Furthermore, it is assumed that the first text processing device is controlled to its active state to which the mode data ARI=2 can be assigned in its current state of operation. The text-block data MT="new world" featured in the processing window W1 of the first text processing device 20 is represented in red when the command data BI="SET COLOR TO RED" occurs. However, it is expressly stated that in accordance with the program run shown in the flow chart 45, all the combinations of command data BI and mode data ARI indicated in the matrix 40 of FIG. 3 can be realized.

When the speech recognition device 2 is activated for inputting spoken command information signals SI, or a further spoken command information signal SI into the personal computer 1, the program run starts according to the flow chart 45 with a block 46. In a next block 47, the test means 33 deliver a sign-on data AI to the management means 22. The sign-on data AI contains a data that the mode data ARI of a text processing device 20 or 21 controlled to its active state is to be transferred to the test means 33. The sign-on data AI particularly contains a data that the mode data ARI is always to be transferred to the test means 33 during the further processing.

In a block 48, a mode data ARI=2 transferred to the test means 33 is stored there. In a subsequent block 49, a test whether a spoken command information signal has occurred is made in the speech recognition means 11 of the speech recognition device 2. As long as this has not occurred, the program run remains in block 49. When a spoken command information signal SI occurs, command data BI and for the first application the command data BI="SET COLOR TO RED", is assigned to the spoken command information signal SI in the speech recognition stage 12, as has already been explained above. A command data BI assigned by the speech recognition stage 12 is transferred to the test means 33 via the work line 37.

In a block 51, the test means 33 test, by means of the stored mode data ARI=2 and the command data BI="SET COLOR TO RED" delivered to the means, whether the first text processing device controlled to its active state is suitable for representing a text-block data VT in its operating state, which text-block data VT is changed in accordance with the command data BI—thus with the first application, is suitable for representing the featured text-block data MT="new world" in red. A text processing device is then suitable for this, if the matrix 40 stores a control data CI or a further control data CI(TVM) in the row of the command data BI and the column of the mode data ARI. With the first application, the matrix 40 indicates BI="SET COLOR TO RED" for the command data and ARI=2 for the mode data and CI=88 for the control data. This defines that the first text processing device 20 itself is configured and provided for changing the text-block data MT="new world" featured in the first text processing device 20.

In a block 52, the test means 33 test whether the control data for the command data BI and the mode data ARI is a control data CI. If the result of the test is positive, the test means 33 deliver the determined control data CI=88 via the work line 31 to the communication means 23 and via the work line 24 to the first text processing device 20. In a block 53, the featured text-block data MT="new world" is changed in accordance with the control data CI delivered to the first text processing device 20 and represented in red here. Subsequently, in block 53, the processing is continued with block 48.

For explaining the further program run according to the flow chart 45, it is assumed with the second application that a spoken command information signal SI is given to the text processing system shown in FIG. 1, to which system the command data BI="CAPITALIZE" is to be assigned. It is further assumed that the first text processing device 20 is controlled to its active state to which device in its operating state the mode data ARI=2 is to be assigned. When the command data BI="CAPITALIZE" occurs, the text block data MT="new world" featured in the processing window W1 of the first text processing device 20 will be represented as changed text data VT="New World" with two initial capitals.

With the second application, the further command data BI="CAPITALIZE" is assigned to the farther spoken command information signal SI in the speech recognition stage 12 at block 50. In block 51, the test means 33 test, by means of the stored mode data ARI=2 and the command data BI="CAPITALIZE" delivered thereto, whether the first text processing device 20 in its operating state is suitable for representing the featured text-block data MT="New World" in accordance with the command data BI="CAPITALIZE", and then determine further control data CI(TVM)=12 from the matrix 40. The test in the block 52 yields that the control data provided for the command data BI="CAPITALIZE" and the mode data ARI=2 is a further control data CI(TVM), as the result of which the processing is continued in block 54.

In block 54 the test means 33 test whether the text editing means 35 is provided for changing the text block data MT="new world" featured in the text processing device 20 in accordance with the spoken command information signal SI and command data BI assigned thereto delivered to the speech recognition device 2, which is the case in the second application, because the further control data CI(TVM)=12 was determined by the test means 33. In the case of a negative result of the test in another application, it would be certain that no control data CI and no further control data CI(TVM) occurred in the matrix 40 for the command data BI defined in the test means 33 and the mode data ARI stored in the test means 33, as a result of which the spoken command information signal SI given to the text processing system is not executed and the program run is continued with block 48 in this case. According to the second example of embodiment of the invention, when there is a negative result of the test, another test is made in block 54, which will be explained in more detail hereinafter.

With a positive result of the test in block 54 in accordance with the second application, the test means 33 are arranged for delivering the further control data CI(TVM)=12 to the determining means 34 via the work line 41, after which the program run is continued with block 55. When the further control data CI(TVM) occurs, the determining means 34 are arranged in block 55 for delivering determining data EI to the communication means 23 via the work line 42. The communication means 23 then determine the text-block data MT="new world" featured in the first text processing device 20 and deliver it via word line 42 to the determining means 34. Subsequently, the program run is continued with a block 56.

In block 56, the determining means 34 are arranged for testing whether the communication means 23 delivered a text-block data MT to the determining means 34 in response to the determining data EI delivered to the communication means 23. With a negative result of this test, which is the case when no text-block data MT is featured in the first text processing device 20 controlled to its active state, the program run is continued with block 48. With a positive result of the test in block 56, the determining means 34 are arranged for delivering a text-block data MT delivered thereto and the further control data CI(TVM)=12 delivered to the text editing means 35 via the work line 43 in block 54, after which the program run is continued with a block 57.

In block 57, the text editing means 35 are arranged for changing the applied text-block data MT="new world" in accordance with the further control data CI(TVM)=12 delivered thereto. Subsequently, the program run is continued with a block 58, in which the text editing means 35 are arranged for delivering the changed text-block data VT="New World" to the communication means 23 via the work line 44 and to the text processing device 20 controlled to its active state via the work line 24 and thus for substituting the changed text-block data VT="New World" for the featured text-block data MT="new world". Subsequently, the program run is continued with block 48.

As can be seen from the second application, advantageously the command vocabulary of the first text processing device 20 is extended by the further spoken command information signal SI to which the further command data BI="CAPITALIZE" can be assigned.

In a third application it is assumed that a spoken command information signal SI, to which the command data BI="SET TO NORMAL" can be assigned, is delivered to the text processing system represented in FIG. 1. It is further assumed that the second text processing device 21 is controlled to its active state, to which second text processing device 21 in its operating state the mode data ARI=3 can be assigned. When the control data BI="SET TO NORMAL" occurs, a text-block data MT="help", which is represented in red and underlined on the display screen 4, but not represented in FIG. 1, and which is featured in the processing window W2 of the second text processing device 21, is shown in black and in a "normal type".

With the third application, in block 51, a further control data CI(TVM)=17 is determined by means of the matrix 40. As a result, as already explained with reference to the second application, the blocks 52, 54, 55 and 56 are processed. In block 57, the determined featured text-block data MT="help" is changed in accordance with the control data BI="SET TO NORMAL". In block 58 the text-block data VT="help" is substituted for the text-15 block data MT="help" featured in the second text processing device 21 changed in the text editing means 35.

As is evident from the third application, advantageously the command vocabulary of the second text processing device 21 is extended by a further spoken command information signal SI to which the further command data BI="SET TO NORMAL" can be assigned.

With a fourth application it is assumed that a spoken command information signal SI to which the command data BI="CALCULATE SINE" is to be assigned is transferred to the text processing system shown in FIG. 1. If either the first or the second text processing device 20 or 21 is controlled to its active state, to which the mode data ARI=1, 2 or 3 can be assigned depending on its state of operation, a further control data CI(TVM)=33 is contained in the matrix 40 for changing a featured text-block data MT. In this respect, the text editing means 35 are arranged for changing a featured text-block data MT, which is here a number, for determining the angle function of the sine of this number and for substituting the sine of the featured number, calculated in the text editing means 35 for the featured number. If, on the other hand, a third text processing device is controlled to its active state, which third text processing device is not shown in the FIG. 1 and which is formed, for example, by the "Excel for Windows" program, to which mode data ARI=4 can be assigned, then, in accordance with the control data CI=67 contained in the matrix 40, the third text processing device itself is arranged for processing a text-block data MT featured in its text processing device. Advantageously, text-editing means 35 are then only needed for changing a featured text-block data MT according to the matrix 40 if a text processing device controlled to its active state is not itself arranged for changing the text-block data MT featured therein. As a further advantage may be stated that, as is evident in the fourth application, the further command data BI="CALCULATE SINE" can be applied to a text-block data MT formed by a number in any text processing device of the text processing system represented in FIG. 1. Consequently, the command vocabulary for the text processing devices is extended by a mode data ARI=1, 2 or 3, which is advantageous.

According to a second of example embodiment of the invention which, however, is not shown in the Figures, whose structure corresponds, in essence, to the text processing system shown in FIG. 1 in the first example of embodiment of the invention, further text editing means of the text change means 32 are formed by a further text processing device. This further text processing device may be formed by the known "Excel for Windows" program. In a matrix stored in the allocation memory 36 in accordance with the second example of embodiment, an additional further control data CI(WVM) may be stored for certain command data BI in the case of certain mode data ARI.

Figure 2:
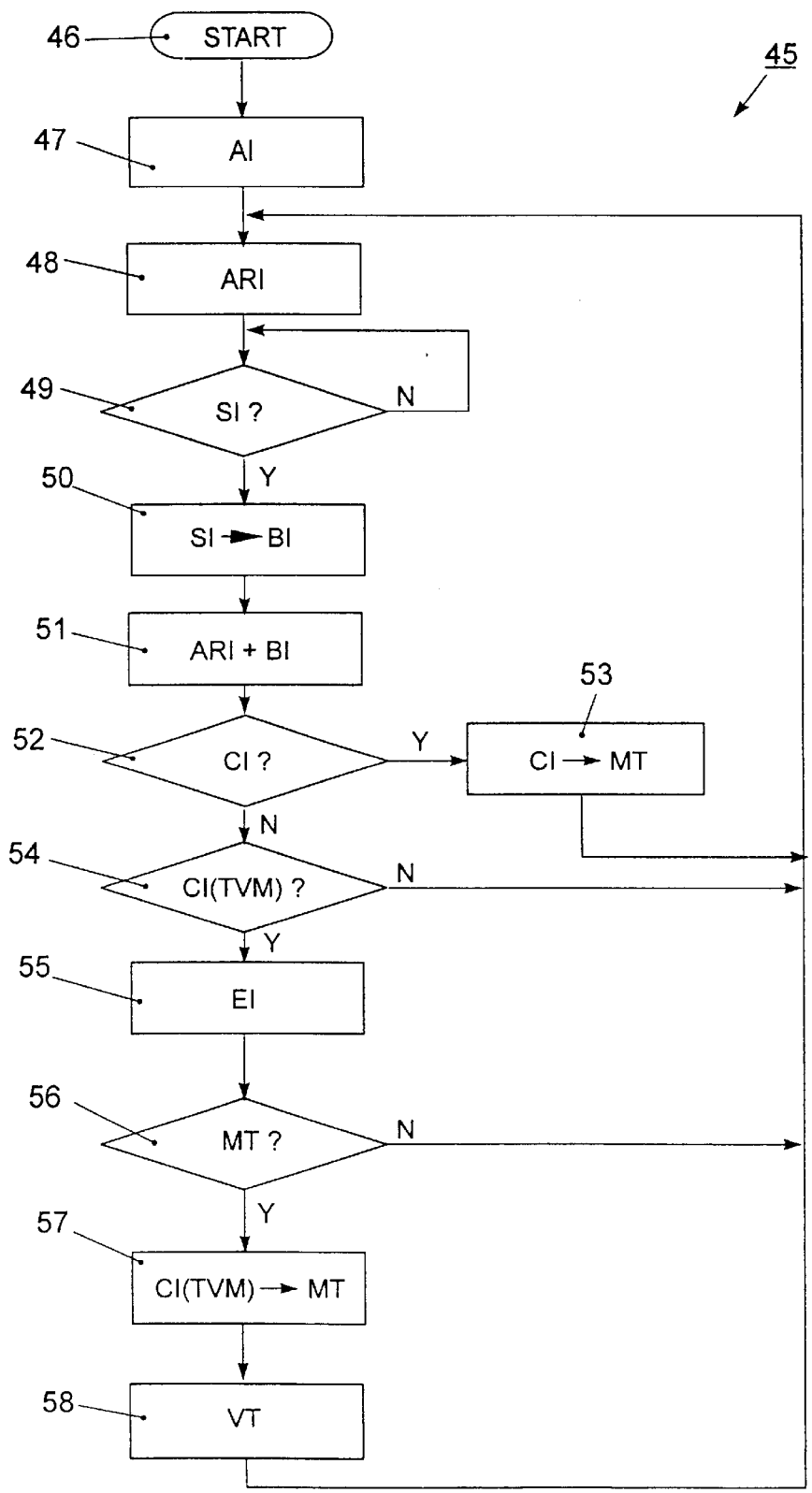
FIG. 2 shows a flow chart with reference to which the method according to the invention can be explained, which method is carried out in the personal computer according to FIG. 1

According to the second example of embodiment, the test means 33 are arranged for performing a further test when the test in the block 54 shown in FIG. 2 has a negative result. With the further test, which is not shown as a block in FIG. 2, there is tested whether the control data from a matrix stored in the allocation memory 36 is an additional further control data CI(WVM).

If the test means 33 determine such an additional further control data CI(WVM), the test means 33 are arranged for delivering the additional further control data CI(WVM) to the determining means 34. The determining means 34 then deliver a determining data EI via the work line 42 to a text processing device 20 or 21 controlled to its active state and then determine a text-block data MT featured in this text processing device 20 or 21. Subsequently, the determining means 34 deliver the determined text-block data MT together with the additional further control data CI(WVM) to the further text processing device for changing the text-block data MT in accordance with the additional further control data CI(WVM). A text-block data VT changed in the further text processing device is then delivered to the determining means 34 by the further text processing device via the communication means 23 and the work line 42. The determining means 34 are then arranged for substituting the text-block data VT, changed in the further text processing device, for the text-block data MT featured in the text processing device 20 or 21 controlled to its active state.

This advantageously achieves that a text-block data MT featured in a text processing device 20 or 21 can additionally also be changed by additional further control data CI(WVM) that can be processed in further text editing means of the text change means 32. Advantageously a very large number of spoken command information signals SI for changing a text-block data MT featured in a text processing device controlled to its active state can be given to the text processing system in accordance with the second example of embodiment of the invention.

In a first application of the text processing system according to the second example of embodiment of the invention, it is assumed that a spoken command information signal SI is given to the text processing system to which the command data BI="CALCULATE SINE" can be assigned. There is further assumed that the first text processing device 20 is controlled to its active state, to which in its operating state the mode data ARI=2 is to be assigned. When the command data BI="CALCULATE SINE" occurs, the trigonometrical function of the sine of the 90° angle of a text-block data MT="90" featured in the first text processing device 20 is to be computed and represented as changed a text-block data VT "1". In accordance with the second example of embodiment of the invention, an additional further control data CI(WVM)=112 is stored in the matrix 40 in the allocation memory 36 together with the command data BI="CALCULATE SINE" and the mode data ARI=2.

When the test means 33 deliver the further control data CI(WVM) to the determining means 34, the determining means 34 are arranged for determining the number "90" of the first text processing device 20 controlled to its active state, and for delivering the determined number "90" and the additional further control data CI(WVM)=112 to the further text processing device featured by the additional further control data CI(WVM), which text processing device is formed by the "Excel for Windows" program. The sine of the number "90" calculated in the "Excel for Windows" program is taken as changed text-block data VT="1" by the determining means and delivered to the first text processing device 20.

This advantageously achieves that the text editing means 35 according to the second example of embodiment of the invention, unlike the text editing means 35 according to the first example of embodiment of the invention, need not be arranged for processing the further control data CI(TVM)=33, because the additional further control data CI(WVM)=112 can be processed by a further text processing device installed on the personal computer 1. As a result, very simple text editing means 35 are obtained and, nevertheless, a large number of spoken command information signals SI can be delivered to the text processing system for changing a marked text-block data MT.

According to a third example of embodiment of the invention, which is not shown in the Figures but which corresponds, in essence, to the first text processing system of the invention represented in FIG. 1, the text editing means 35 in the speech recognition device 2 is omitted, while use is made of text editing means exclusively formed by one or various further text processing devices for changing a text-block data MT featured in a text processing device. This advantageously achieves a highly cost-effective text processing system and a highly cost-effective speech recognition device.

The speech recognition devices of the text processing systems according to the three examples of embodiment are advantageously arranged for cooperating with a Windows processing device which achieves that the test means, the determining means and the text editing means have a very simple structure.

It may be observed that the determining means may also be designed for determining a whole text data TI that contains featured text-block data MT. The determined text data TI is then delivered by the determining means to the text editing means, which are arranged for changing a featured text-block data MT of text data TI delivered thereto, and the whole text data TI including the changed text-block data VT contained therein, to the text processing device controlled to its active state. In the text processing device controlled to its active state, the text data TI with the changed text-block data VT is then substituted for the text data TI with the featured text-block data MT.

What is claimed is:

1. A text processing system, comprising:
   an input for providing text selection commands and editing commands;
   a first text editor for selecting text according to the text selection commands and for editing the selected text according to first predetermined editing commands when the first text editor is activated;
   a second text editor for editing the selected text according to second predetermined editing commands when an editing command to edit the selected text is one of the second predetermined editing commands and not one of the first predetermined editing commands when the second text editor is not activated and first text editor is activated when the editing command is received.

2. The text processing system of claim 1 wherein the input includes a speech recognition device for providing the text selection commands and editing commands in response to spoken input.

3. A text processing system, comprising:
   an input for providing editor activation commands and text selection commands and editing commands;
   multiple text editors each for selecting text according to the text selection data and for editing the selected text according to predetermined editing commands of the text editor, the text editors having different predetermined editing commands;
   control means for activating one of the multiple text editors according to the activation commands, the editor activated being a command activated editor, only one editor at a time being the activated, and for determining whether each of the editing commands for editing the selected text are included in the predetermined commands of the command activated editor, and if not, then selecting another editor that includes the editing command in its predetermined editing commands, that editor being a control selected editor, and for activating the control selected editor for editing the selected text according to the editing command, and then for reactivating the command activated editor for subsequent editing.

4. The text processing system of claim 3 wherein the input includes a speech recognition device for providing the editor activation commands and text selection commands and editing commands in response to spoken input.

* * * * *